May 11, 1954
I. W. COX
2,677,877
GLASS TO METAL SEAL AND PARTS THEREOF
AND METHOD OF MAKING SAME
Filed April 30, 1948
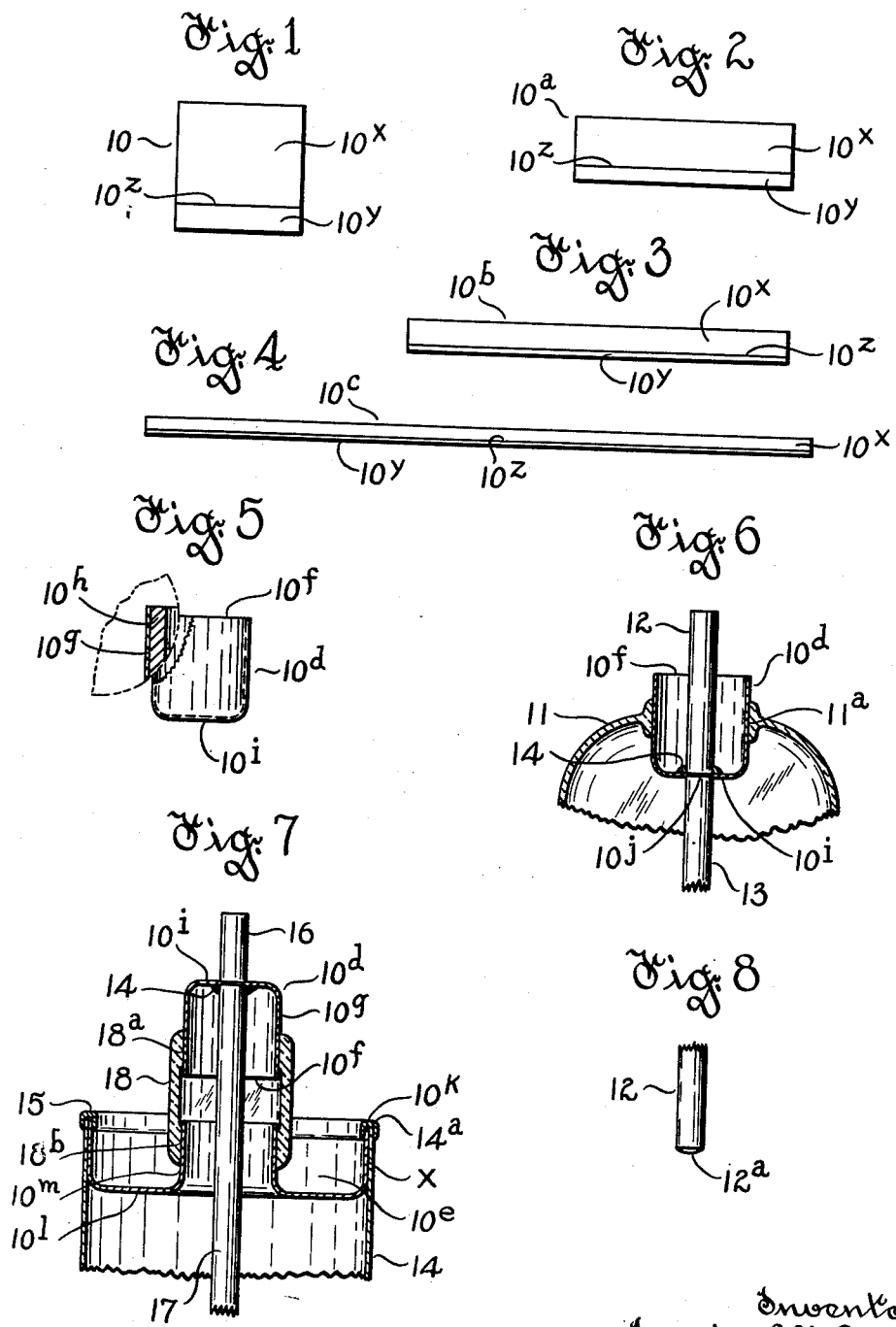
Inventor
Irvin W. Cox
By Frank H. Hubbard
Attorney Patented May 11, 1954

2,677,877

UNITED STATES PATENT OFFICE 2,677,877

GLASS TO METAL SEAL AND PARTS THEREOF AND METHOD OF MAKING SAME

Irvin W. Cox, West Allis, Wis., assignor to Cutler-Hammer, Inc., Milwaukee, Wis., a corporation of Delaware Application April 30, 1948, Serial No. 24,128

4 Claims. (Cl. 29—179.5)

This invention relates to glass to metal seals and parts thereof and methods of making the same. The invention relates more particularly to metal members of suitable form composed of integrally united layers or laminations of different alloys of metals, one of said alloys being adapted to provide a perfectly tight and unusually strong seal with high melting point glasses and another of said alloys being adapted to substantially match the non-linear thermal expansion characteristics of such glasses.

A primary object of the invention is to provide a more perfect glass to metal seal than has heretofore been found possible.

Another object is to provide a laminated-alloy metal sealing member, and a novel method of producing the same.

Another and more specific object is to provide for production of such a metal sealing member according to the technique of powder metallurgy.

Other objects and advantages of the invention will hereinafter appear.

Heretofore in the use of alloys rich in cobalt for sealing with glass considerable difficulty has been encountered in obtaining a uniform oxide coating of maximum mechanical strength when the glass to metal seal is finished and gas-tight or vacuum-tight. Thus with a metal sealing member composed of an alloy of 29 per cent nickel, 17 per cent cobalt, 0.3 per cent manganese, and balance iron (which alloy is sold commercially under the trade-name of "Kovar"), it was found that such a member when heavily oxidized so as to afford a mechanically strong seal with a suitable high melting point glass was likely to be porous in the oxidized area, with a resultant lack of vacuum-tightness; whereas such a metal member when lightly oxidized so as to insure a vacuum-tight seal with such glass, resulted in a seal which was inherently relatively weak mechanically.

On the other hand, an alloy containing 42 per cent nickel, 6 per cent chromium, and 52 per cent iron (which alloy is sold commercially under the trade-name of "Sealmet No. 4") contains enough chromium so that the chromic oxide layer formed by processing the alloy in a hydrogen furnace, with the hydrogen saturated with water vapor at about 90 degrees F., gives, under these conditions, a protective layer of chromic oxide sufficiently thick and of proper nature to prevent subsequent formation of iron oxide. Moreover, this chromic oxide layer partially dissolves in the molten or fused glass and furnishes a substantially perfect vacuum-tight seal of unusual mechanical strength. Stated another way, the chromic oxide layer formed on the last mentioned alloy, by heat treatment at a high temperature in wet hydrogen, is sufficiently adherent and impermeable on the exposed surface of the alloy itself to prevent oxidation of iron in the alloy underneath, even in the highly oxidizing flames on the high speed production equipment of present manufacturing processes; and at the same time such oxide layer is adapted to flux with the glass to afford a vacuum-tight and unusually strong mechanical bond.

Although the alloy just described is better suited for sealing to the glass and gives a mechanically stronger bond than that of the first mentioned alloy, such "Sealmet No. 4" alloy does not match so well the non-linear thermal expansion characteristics of high melting point glasses having low coefficients of thermal expansion as does the aforementioned iron, nickel, cobalt alloy, rich in cobalt.

In accordance with my invention the best properties or characteristics of both of the aforementioned alloys are obtainable in a single metal member forming an essential part of the glass to metal seal, by applying the principles of powder metallurgy, as will now be described. Thus, a molding cavity of any suitable or preferred size is eighty per cent filled with thoroughly mixed metal powders as follows, having substantially the following proportions, by weight: nickel 29 per cent; cobalt 17 per cent; iron 53.7 per cent, and manganese 0.3 per cent. The upper surface of said eighty per cent fill is leveled in any well known manner, and the remaining twenty per cent of the molding cavity is filled with the following metal powders likewise thoroughly mixed in substantially the following proportions, by weight: nickel 42 per cent, chromium 6 per cent, and iron 52 per cent.

The mixtures of powdered metals within said molding cavity are then jointly or simultaneously subjected to a suitable molding pressure (say, 10,000 to 20,000 pounds per square inch) to provide a prepressed slug or unit of about 0.3 inch thickness which is adapted to withstand the ordinary handling involved in the next step of treatment thereof. Such prepressed slug is then subjected to a suitable heat sintering operation at about 2200 to 2300 degrees F. in an atmosphere of dry hydrogen, dried over molten sodium. The sintered slug is then subjected to a rolling operation, to effect a reduction of approximately fifty per cent in the thickness thereof, with a proportional increase in the upper and lower surface areas thereof. The rolled slug is then subjected to a second heat treatment, followed by a second rolling operation, to effect a reduction of about fifty per cent in the thickness of the rolled slug. The twice rolled slug is then subjected to another heat treatment, whereupon it is subjected to a third rolling operation, to again reduce the thickness thereof by about fifty per cent. With the slug thus reduced to approximately one-eighth of its original thickness, and of approximately eight times its original upper and lower surface areas, it is then subjected to another heat treatment, after which it is rolled, without further heat treatment, to a thickness of approximately .010 inch. The rolled plate is then annealed in dry hydrogen, then punched or cut into blanks of suitable form, and each blank then drawn into the form of a cup, as shown and described in that form of my invention applied to a glass tube or envelope, or each blank when of suitable shape may be drawn into the form of an annulus of channel form in transverse cross section, as shown and described in that form of my invention applied to a metal tube or envelope, wherein one or more of the members of cup form will also be employed.

With a plate thickness of approximately .010 inch, as aforedescribed, it is to be understood that the layer of the "Kovar" alloy will be about .008 inch thick, and the layer of "Sealmet No. 4" alloy will be about .002 inch thick. The blank will usually be drawn in a manner to provide for exterior location of the "Sealmet No. 4" alloy when a cup-shaped member is required, and the blank will be drawn to provide for interior location of the "Sealmet No. 4" alloy when a member of annular form is required.

The accompanying drawings illustrate certain embodiments of my invention which will now be described; it being understood that the embodiments illustrated are susceptible of modification in respect of certain structural details thereof and/or in respect of the specified percentages of the ingredients of the respective alloys without departing from the spirit and scope of my invention as defined in the appended claims.

In the drawings, Figure 1 is a side elevational view illustrating somewhat diagrammatically a prepressed or molded slug or unit having the desired proportionality of thicknesses of the respective layers of the two groups of powdered alloy ingredients.

Fig. 2 is a similar view of the slug or unit of Fig. 1 after heat sintering thereof in an atmosphere of dry hydrogen and subsequent rolling thereof for effecting a reduction of approximately fifty per cent in its thickness, and a corresponding increase in the upper and lower surface areas thereof.

Fig. 3 is a similar view of the rolled slug of Fig. 2 after heat treatment of the latter and rolling thereof to effect a reduction of approximately fifty per cent in its thickness.

Fig. 4 is a similar view of the rolled slug (or laminated plate) of Fig. 3 after a suitable heat treatment of the latter and rolling thereof to effect a further reduction in thickness of about fifty per cent.

Fig. 5 is an elevational view of a laminated cup produced in accordance with my invention; a fragment of the cup being cut or broken away, and the wall section magnified to show the relatively thin and relatively thick layers of the respective alloys.

Fig. 6 is a fragmentary view, partly in section and partly in elevation, of a glass tube or envelope having one of my improved laminated alloy sealing members sealed thereto and supported thereby.

Fig. 7 is a fragmentary view, partly in section and partly in elevation, of a metal tube or envelope having a laminated alloy member of annular form the exterior alloy layer of which is peripherally united with the inner surface of the metal tube, a body of glass being sealed to the inner alloy layer and to the outer alloy layer of a cup-shaped member of the character shown in Figs. 5 and 6, and Fig. 8 is a fragmentary elevational view of one of the conducting metal terminal or supporting members prior to rigid and permanent attachment thereof to the cup member by welding.

Referring to Fig. 1, the numeral 10 designates a molded slug or preform preferably composed of a relatively thick layer $10^x$ consisting of a thorough mixture of 29 per cent nickel, 17 per cent cobalt, 53.7 per cent iron, and 0.3 per cent manganese; whereas the relatively thin layer $10^y$ consists of a thorough mixture of 42 per cent nickel, 6 per cent chromium, and 52 per cent iron; all of said metal ingredients being initially in powder form, and the slug as a whole having been molded at a suitable pressure, of from 10,000 to 20,000 pounds per square inch, to integrally unite said layers with each other, and to provide for handling of the slug without chipping thereof or disintegration of the ingredients of the respective layer. The line $10^z$ shows diagrammatically that the layer $10^y$ comprises approximately one-fifth of the total thickness of the slug and the layer $10^x$ comprises the remainder of such thickness.

The slug 10, of about 0.3 inch thickness, is then sintered, in an atmosphere of dry hydrogen, at a temperature of about 2200 to 2300 degrees F., to effect at least partial alloying of the particles of the ingredients of the respective layers. Slug 10 is then rolled to reduce the thickness thereof by about one-half, as shown at $10^a$ in Fig. 2. The rolled slug $10^a$ of Fig. 2 is then subjected to a second heat treatment, at a sufficiently high temperature to anneal the same; that is, to counteract the effect upon the ingredients of the respective layers of the aforementioned rolling operation. The slug of Fig. 2 is then rolled to reduce its thickness by about one-half, as shown at $10^b$ in Fig. 3; and the twice rolled slug or plate of Fig. 3 is then subjected to a heat treatment like that last mentioned. The heat treated plate of Fig. 3 is then subjected to a rolling operation to reduce its thickness by about one-half, to provide the plate shown at $10^c$ in Fig. 4. Thereupon the plate $10^c$ of Fig. 4 is subjected to a heat treatment like that last mentioned; whereupon the plate $10^c$ without further heat treatment, is rolled a sufficient number of times to reduce the thickness thereof to approximately ten-thousandths of an inch. After completion of the last mentioned rolling operation, the plate (not shown) is annealed at a suitable temperature in an atmosphere of dry hydrogen. Said completely rolled and annealed plate is then subjected to a cutting or punching operation to provide a multiplicity of sheet metal blanks of the desired size and contour.

In practice the metal blanks (not shown) are punched in circular form when a cup-shaped member like that shown at $10^d$ (in Figs. 5, 6 and 7) is to be produced; or blanks of annular form, and of substantially greater diameter, are punched from the metal plate, when annular members like that shown at 10e in Fig. 7 are to be produced. Said circular blanks are subjected to any suitable or well known type of drawing or forming operation to provide cup-shaped members like that shown at 10d. After drawing or forming of such blanks the peripheral wall surrounding the open end of each member 10d may be cut or ground to provide a straight edge portion 10f, to provide a more finished appearance to the article.

As shown in Fig. 5 the relatively thin layer 10g of the ferrous alloy rich in chromium is located upon the exterior of member 10d, and the relatively thick layer 10h is located interiorly of member 10d. The cup-shaped members 10d, in the final form thereof shown in Fig. 5, are then subjected to a suitable heat treatment in wet or moist hydrogen, whereby there is produced upon the outer or exposed surface areas of the same a protective layer of chromic oxide (not shown) which is sufficiently adherent and impermeable to insure against oxidation of iron in the alloy layer 10g.

Prior to sealing the metal member 10d into a tube 11 of high melting point glass (such as "Corning No. 705-2" glass, for example, which is a well known type of borosilicate glass) member 10d has rigidly attached thereto suitable lengths 12 and 13 of a solid metal rod, preferably composed of nickel or iron, as by welding the adjacent ends of members 12 and 13 to the inner and outer surfaces respectively of the closed end wall 10i of member 10d. Said adjacent ends of members 12 and 13 are preferably initially of convex form, as shown at 12a in Fig. 8, to facilitate uniting of members 12 and 13 to wall 10i by a sort of spot-welding operation; the welding current being passed between members 12 and 13 through said wall 10i. The portion 10j of wall 10i is preferably not completely fused as an incident to the welding operation; but as a precaution I prefer to apply an annular filler of silver solder, or the like, between the inner surface of wall 10i and the periphery of member 12, to insure a sealing connection between these metal parts, and to strengthen the mechanical connection between wall 10i and member 12; which latter is adapted to serve as one of the circuit terminals of the tube; say, the anode terminal. The member 13 has attached thereto any suitable form of anode (not shown) which is supported thereby.

With the parts properly positioned (Fig. 6) the portion 11a of the glass tube 11 is fused in any well known manner; a portion of the chromium oxide layer upon the outer surface of member 10d being dissolved in the contacting part of the portion 11a of tube 11 when said portion is in fused condition. By this means a vacuum-tight and mechanically strong seal or connection is provided between the member 10d and portion 11a of the vacuum tube 11.

It is to be particularly noted that in the use of the aforementioned alloys in laminated form the portion 11a of the tube 11 is not sealed to the ferrous alloy high in cobalt (10h, Fig. 5). Further, it is to be understood that a strain-free seal between the glass tube 11 and the member 10d is not produced. However, adequate freedom from strain is obtained. The layer 10g of alloy (composed of iron, nickel and chromium) is under strain; but such alloy is of a ductile nature so that it is able to follow the iron, nickel, cobalt alloy base portion 10h to which it is integrally united or bonded; which portion 10h has substantially the same coefficient of thermal expansion, and substantially the same non-linear variation of said coefficient of thermal expansion as the aforementioned high melting point glass of tube 11 to which the cup-shaped member 10d is sealed.

In the metal type vacuum tube shown in Fig. 7 the numeral 14 designates the main hollow metal body portion, into the open upper end of which the aforementioned annular metal sealing member 10e is telescoped, with the open end of the channel of member 10e facing upwardly, and with the upper edges 10k and 14a of said members in substantial alinement. Member 10e may be produced from a blank punched from the laminated alloy plate aforementioned; but in this instance the blank is drawn in such a manner that the relatively thick layer of ferrous alloy rich in cobalt is located exteriorly of member 10e, as indicated by numeral 10l, whereas the relatively thin layer of ferrous alloy rich in chromium is locately interiorly of member 10e. Member 14 and member 10e are mechanically united by any desired number of spot-welds around the periphery of these parts; and thereafter a continuous line of welding or brazing material is applied to the aforementioned upper edges 10k and 14a, to rigidly and permanently unite the latter and form a vacuum-tight seal therebetween, as indicated at 15.

A laminated alloy sealing member 10d, aforedescribed, is likewise employed in the vacuum-tight seal of Fig. 7; member 10d having an iron or nickel terminal rod 16 positioned upon and attached to the outer surface of the closed end wall 10i, and an iron or nickel anode supporting rod 17 positioned upon and attached to the inner surface of said closed end wall 10i, by a welding operation of the character aforedescribed. A fillet of silver solder or the like (not shown) may be applied between the periphery of either the end of rod 16 or the end of rod 17 and the respectively adjacent surface of said end wall 10i.

A tubular glass member 18 composed of the aforementioned high melting point borosilicate glass is positioned in telescopic relationship to the outer surface of the inverted cup-shaped member 10d and to the inner surface 10m of the inner circular wall of the upwardly opening annular member 10e, so that upon fusing of the overlapping end portions 18a and 18b the same will be united in a mechanically strong and vacuum-tight relationship to the members 10d and 10e; the thin layers 10g and 10m of said members being composed of the aforementioned alloy rich in chromium; and the layers of chromium oxide on the respective members assisting, as aforedescribed, in providing for attainment of the desirable results herein contemplated.

Although I have hereinabove indicated a preference for a proportionality of ingredients corresponding with that of the "Sealmet No. 4" ferrous alloy rich in chromium; it is to be understood that other ferrous alloys rich in chromium may be employed. For example, I may provide a relatively thin layer for sealing to the borosilicate glass in which seventy per cent of the mixture of metal powders consists of iron and the remaining thirty per cent of which mixture consists of chromium; the relatively thick layer of ferrous alloy rich in cobalt preferably having a proportionality of its ingredients corresponding with that of the aforementioned "Kovar" alloy.

I claim:

1. A metal member adapted for sealing to a body of high melting point glass, said member comprising a dual-layered integrally molded ferrous alloy, one of said layers comprising approximately 29 per cent nickel, 17 per cent cobalt, 0.3 per cent manganese, remainder iron, thereby affording a coefficient of expansion for said layer which approximates that of said glass body, and the other of said layers being relatively thinner and comprising approximately 42 per cent nickel, 6 per cent chromium, remainder iron, to afford fusion thereof with said glass body to effect a strong mechanical seal therebetween.

2. The method of making an electrical device in which a body of high melting point glass is sealed to a metallic member, which comprises forming the member of a layer of alloy having a thermal expansion characteristic matching that of said glass integrally united with an overlying layer of alloy rich in a metal whose oxide is soluble in said glass, oxidizing the exposed surface of the latter layer and then sealing the glass to said outer layer.

3. The method of making an electrical device in which a body of high melting point glass is sealed to a metallic member, which comprises the steps of forming the member of a layer of alloy rich in cobalt and having a thermal expansion characteristic matching that of said glass integrally united with an overlying layer of alloy rich in chromium, oxidizing the exposed surface of the latter layer, and then fusing the glass to said oxidized alloy surface.

4. A glass metal seal member having fusion characteristic and expansion coefficient compatible with high melting point glass, comprising integrally united layers of an alloy comprising approximately 29 per cent nickel, 17 per cent cobalt, 0.3 per cent manganese, remainder iron, and an alloy comprising approximately 42 per cent nickel, 6 per cent chromium, remainder iron.

References Cited in the file of this patent

UNITED STATES PATENTS

| Number | Name | Date |
|---|---|---|
| 1,848,182 | Koebel | Mar. 8, 1932 |
| 1,993,020 | Scott | Mar. 5, 1935 |
| 2,062,335 | Scott | Dec. 1, 1936 |
| 2,219,423 | Kurtz | Oct. 29, 1940 |
| 2,219,573 | Fraenckel | Oct. 29, 1940 |
| 2,241,095 | Marvin | May 6, 1941 |
| 2,267,954 | Schumacher | Dec. 30, 1941 |
| 2,274,999 | Allen | Mar. 3, 1942 |
| 2,288,184 | Dodson | June 30, 1942 |
| 2,332,416 | Waltenberg | Oct. 19, 1943 |
| 2,323,162 | Talmage | June 29, 1943 |
| 2,343,038 | Allen et al. | Feb. 29, 1944 |
| 2,350,491 | Butler et al. | June 6, 1944 |
| 2,369,146 | Kingston | Feb. 13, 1945 |
| 2,394,919 | Kingston | Feb. 12, 1946 |
| 2,398,529 | Holmquist | Apr. 16, 1946 |
| 2,399,758 | Pierri | May 7, 1946 |
| 2,422,628 | McCarthy | June 17, 1947 |
| 2,442,223 | Uhlig | May 25, 1948 |
| 2,446,277 | Gordon | Aug. 3, 1948 |
| 2,502,855 | Kingston | Apr. 4, 1950 |
| 2,515,337 | Clark | July 18, 1950 |